R. S. Sanborn,

Fire-Proof Safe.

No. 2,390. Reissued Nov. 6, 1866.

Witnesses.

A. H. Spatman

F. Lehmann.

Inventor.

Rufus S. Sanborn per

Alexander Y. Mason

Attorney

AM. PHOTO-LITHO. CO. N.Y. (OSBORNE'S PROCESS.)

UNITED STATES PATENT OFFICE.

RUFUS S. SANBORN, OF RIPON, WISCONSIN.

IMPROVEMENT IN SAFES.

Specification forming part of Letters Patent No. 56,452, dated July 17, 1866; Reissue No. 2,390, dated November 6, 1866.

*To all whom it may concern:*

Be it known that I, RUFUS S. SANBORN, of Ripon, Fon du Lac county, Wisconsin, have invented certain new and useful Improvements in Steam and Fire Proof Safes; and do hereby declare that the following is a full, clear, and exact description of the same, reference being had to the accompanying drawings, and the letters of reference marked thereon, making a part of this specification.

In the annexed drawings, making a part of this specification, A represents a case or trunk, made of iron, said outside being of a square form, and when designed to receive cylinders it has a lining of cylindrical form; but when the inner chambers are to be square-shaped instead of cylindrical, the lining of the case A will be of square shape.

Figure 2:
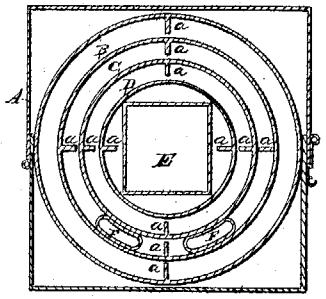
Figure 1:
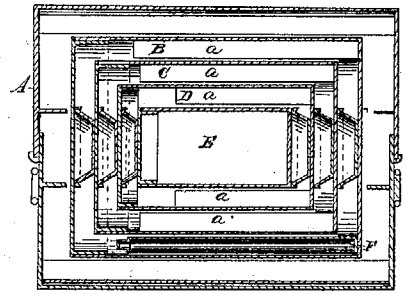
Figure 3:
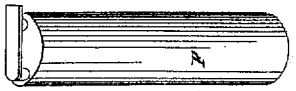

B C D represent three concentric cylinders, which are made of metal, are placed within the case A, as shown, and which, if made in a square form, would present quadilateral views in Fig. 2, annexed drawings.

These cylinders, as would also be the case with the square form of boxes, are separated from each other and from the outer case by means of flanges or partitions *a*. These flanges are placed on the four sides of the boxes or cylinders in order to keep them centrally located.

E represents a square box or the inner receptacle for books and papers, and is placed in the inner cylinder, D, as shown in the figure, and when boxes are used the said box E would be placed in the square box corresponding to the cylinder D.

It readily appears that there are thus formed a series of concentric air-chambers, or when in the square form a series of square air-chambers, between each cylinder or box and the case A. The object of these air-chambers is to prevent the passage of heat from the outer case to the inner box, E, or receptacle for books, papers, and other matters of value.

In the air-spaces between the cylinders B, C, and D, or their equivalents of boxes, are placed two or more metallic water-vessels, F F, of such shape and form, concave on one side and convex on the other, as to fit snugly in their places. These water-vessels are constructed with flat sides when intended for insertion between the square boxes, and are provided each with an orifice at the top, through which water is introduced into them. These orifices are closed after the water has been placed in the vessels by spring-valves. Said springs are so made that they will allow the steam to escape after the water has been converted thereto, and cause the steam to pass around and fill the air-chambers.

In case of fire, and these vessels becoming heated so as to generate steam, the steam, expanding many times the volume of water from which it is generated, helps to fill the air-chambers in the safe and saturates whatever hot air there may be in the safe with a steam-moisture, so as to prevent the contents of the inner box from burning or charring.

It will be understood that this safe is not made sufficiently tight to exclude air, so that there never will be any danger from bursting from either steam or heated air.

The case A is hinged at its center, so that in opening it the upper half lifts up by turning upon its hinge.

It may not be necessary to use a distinct covering for each cylinder, but only a door with raised covers upon it to fit the box E and each of the cylinders, so that when the door is opened the covers of each cylinder and the inner box, E, are opened at the same time; also, when boxes are used, each one may have a cover or door hung with hinges and opening outward, as in common trunk-covers or safe-doors.

This invention is intended either as a portable fire-proof safe for express companies, or for private use, or, when made of large size and with boxes instead of cylinders forming the inside, and doors instead of covers opening outward, for any other use, such as counting-houses or banks.

I do not propose to confine myself to any specific number of cylinders or their equivalents in boxes, or to any particular size or peculiar kind of material of which they are made. The outer case may be made of iron, as also one or two of the inner cylinders or boxes.

Having thus fully described my invention, what I claim as new, and desire to secure by Letters Patent, is—

1. The combination of two or more concentric cylinders or cases, B C D, whether in the form herein represented or otherwise, when each cylinder or case is separated from the next one to it within or without in such a manner that air is allowed to circulate freely all around it, both at its sides and ends, as and for the purpose represented.

2. The combination of the water-vessels F F, or their equivalents, when used with the cylinders or cases B C D, arranged as specified, whereby steam from said vessels may be allowed to circulate freely around the sides and ends of the cases, substantially as and for the purpose herein specified.

3. The arrangement of the inner box, E, for containing books and papers, with the cylinders B C D, or their equivalents in box form, and an outer case, A, substantially as and for the purposes herein set forth.

As evidence that I claim the foregoing I have hereunto set my hand in the presence of two witnesses.

RUFUS S. SANBORN.

Witnesses:
H. B. WILLIAMS,
R. V. HILL.